US012306965B2

(12) United States Patent
Pasternak

(10) Patent No.: US 12,306,965 B2
(45) Date of Patent: May 20, 2025

(54) SMART READ-ONLY MODE FOR WEB BROWSING

(71) Applicant: Ericom Software Ltd., Jerusalem (IL)

(72) Inventor: Erez Pasternak, Modiin (IL)

(73) Assignee: Ericom Software Ltd., Jerusalem (IL)

( * ) Notice: Subject to any disclaimer, the term of this patent is extended or adjusted under 35 U.S.C. 154(b) by 224 days.

(21) Appl. No.: 17/720,394

(22) Filed: Apr. 14, 2022

(65) Prior Publication Data

US 2022/0245263 A1 Aug. 4, 2022

Related U.S. Application Data

(60) Provisional application No. 63/177,488, filed on Apr. 21, 2021.

(51) Int. Cl.
| | |
|---|---|
| *G06F 21/60* | (2013.01) |
| *B41J 2/005* | (2006.01) |
| *B41J 2/21* | (2006.01) |
| *B41J 29/38* | (2006.01) |
| *G06F 3/12* | (2006.01) |

(52) U.S. Cl.
CPC .......... *G06F 21/604* (2013.01); *B41J 2/0057* (2013.01); *B41J 2/21* (2013.01); *B41J 29/38* (2013.01); *G06F 3/1208* (2013.01); *G06F 3/1229* (2013.01)

(58) Field of Classification Search
CPC ...................................... G06F 21/604
See application file for complete search history.

(56) References Cited

U.S. PATENT DOCUMENTS

| | | | |
|---|---|---|---|
| 2010/0064232 A1* | 3/2010 | Brandwine | G06F 21/6209 715/760 |
| 2020/0193066 A1* | 6/2020 | Johns | H04L 63/06 |
| 2021/0092155 A1* | 3/2021 | Wang | H04L 63/083 |

* cited by examiner

*Primary Examiner* — Gil H. Lee

(74) *Attorney, Agent, or Firm* — Rivka Friedman

(57) ABSTRACT

A method for secure browsing, including: providing a system for protecting a user browsing an internet website; rendering a requested web page of the website into read-only mode; and changing selected input fields on the requested web page into write mode. A method for secure browsing, including: providing a system for protecting a user browsing an internet website; and rendering selected input field on a web page of the website into read-only mode.

4 Claims, 6 Drawing Sheets

SMART READ-ONLY MODE FOR WEB BROWSING

This patent application claims the benefit of U.S. Provisional Patent Application No. 63/177,488, filed Apr. 21, 2021, which is incorporated in its entirety as if fully set forth herein.

FIELD OF THE INVENTION

The present invention relates to Internet communications and, more particularly, to a method and system ensure that no 3rd party or unauthorized applications operate on a local machine during a web conference session.

BACKGROUND OF THE INVENTION

Remote Browser Isolation (RBI) is an advanced cybersecurity technique that provides an additional layer of protection for users and organizations. Browser isolation separates browsing activity from endpoint hardware, thereby reducing the end user device's attack surface. When a user accesses a web page or app, it is loaded onto a remote browser that serves a rendering of the webpage to the user. The page operates normally, but only pixels are delivered to the user. There is no active content downloaded, so malicious code that may be hidden in the webpage is kept at bay.

A web conference is an online meeting in which participants of the meeting can share a real-time view of their computer screen with other meeting participants. Web conferences are often used to facilitate the demonstration of new software, to give a web seminar, or to facilitate a variety of other types of presentations over the Internet, such as collaboration or white boarding. A web conference is often used in conjunction with Audio and Video Conferencing. In operation, the meeting moderator connects, most often using a browser, to a web conferencing service. The service allows participants the ability to share with other meeting participants the real-time view of a particular application or an entire desktop screen. Similarly, each meeting participant accesses the service to view the shared content via a web browser on his/her machine.

Web meetings are a growing industry, as companies seek to reduce travel costs with collaborations partners. These meetings often can have very dynamic sets of participants. In web conferencing the use of unknown or insecure 3rd party applications often occurs and due to the sometimes-intricate nature of the meeting proceedings it is necessary to conduct the web conference session but to preclude the execution of insecure software on a local operating machine.

This problem (of insecure or unapproved 3rd party application software executing on a machine) is exacerbated in larger meetings and in common corporate meetings, wherein invitees are using their locally controlled, often personal machine to conduct the web conference and often have administrative control that allows them to use any variety of unapproved or insecure applications that might introduce risk into the connected machines that are present in the web meeting session.

Another use case is when people from different organizations are joining the meeting, so even if the first organization has full control of the Web conference application/service—(e.g., an in-house app), the other participants are less secure.

In addition, using Web Conferencing software, participants are often able to share files with other participants. These files may be infected (e.g., malware, ransomware, etc.) or expose sensitive information like credit card numbers, and there is no easy way for the enterprises to control what can be shared and how.

To make the problem even harder to solve, there are many web conference applications, and in many situations, people use 3 or 4 different applications depending on what the other people are using, so a generic solution is needed.

Also, when companies allow the users to use web conferencing, they still want to be able to have control, like being able to define which user can access which web conferencing "site", have audit log to track usage, and being able to restrict actions such as using the clipboard function, file upload or download, set DLP rules and scan downloaded files.

SUMMARY OF THE INVENTION

The instant disclose provides improved techniques for eliminating the risk that 3rd party software introduces into web meetings.

The disclosed technique uses remote browser isolation to secure a web conferencing session and eliminate the risk that 3rd party unapproved software might be introduced to a local user machine.

The instant system allows the admin to allow the web conference, and be able to allow/block resource sharing, like allowing screen sharing but blocking webcam sharing. According to the present invention there is provided a method for secure browsing, including: providing a system for protecting a user browsing an internet website; rendering a requested web page of the website into read-only mode; and changing selected input fields on the requested web page into write mode.

According to further features in preferred embodiments of the invention described below the selected input fields are selected automatically.

According to still further features the input field are selected using a machine learning model.

According to still further features the selected input fields are selected manually via a user interface.

According to another embodiment, there is provided a method for secure browsing, including: providing a system for protecting a user browsing an internet website; and rendering selected input field on a web page of the website into read-only mode.

According to further features, the selected input fields are selected automatically.

According to still further features, the input field are selected using a machine learning model.

According to still further features, the selected input fields are selected manually via a user interface.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of methods and systems which utilize remote browser isolation to secure a web conferencing session and eliminate the risk of a 3rd party introducing unapproved software on a local user machine according to the present invention may be better understood with reference to the drawings and the accompanying description. The methods and systems also utilize remote browser isolation to enable resource sharing in a safe manner.

Some embodiments of the present invention are described herein, by way of example only, with reference to the accompanying drawings. With specific reference to the drawings in detail, it is stressed that the particulars shown are by way of example and merely for the purposes of illustrative discussion of example embodiments of the invention. In this regard, the description taken with the drawings makes apparent to those skilled in the art how embodiments of the invention may be practiced.

Figure 1A:
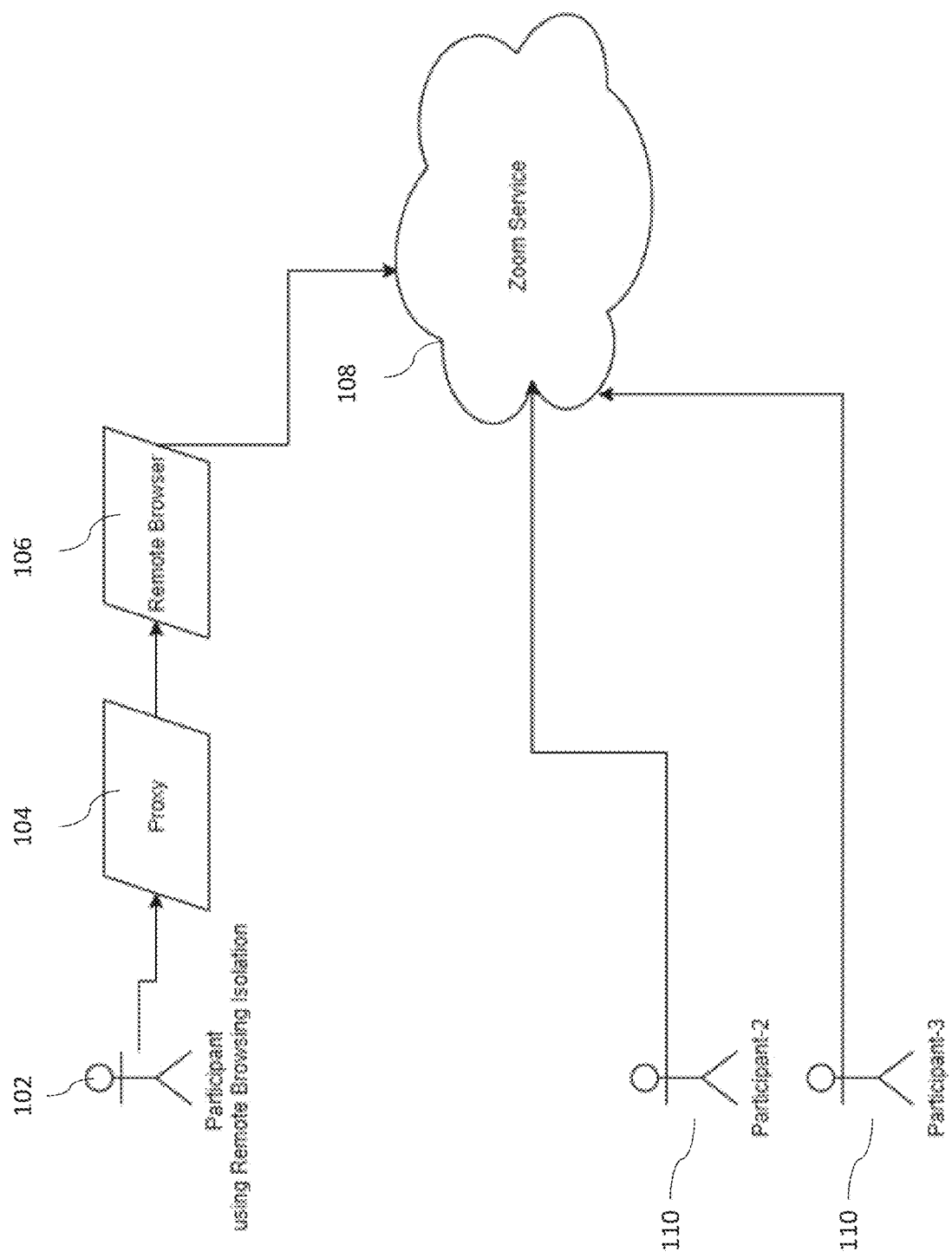
FIG. 1A is a diagram illustrating an example system environment and architecture of embodiments according to one aspect of the present invention.

Referring now to the drawings, FIG. 1A is a diagram illustrating an example system environment and architecture of embodiments according to one aspect of the present invention. The example embodiment includes a first participant 102 using the Remote Browsing Isolation solution of the present invention connected to a web service (in this example a web conference service exemplarily illustrated as a Zoom™ Service) 110 via a proxy 104 and a remote browser 106.

Figure 1B:
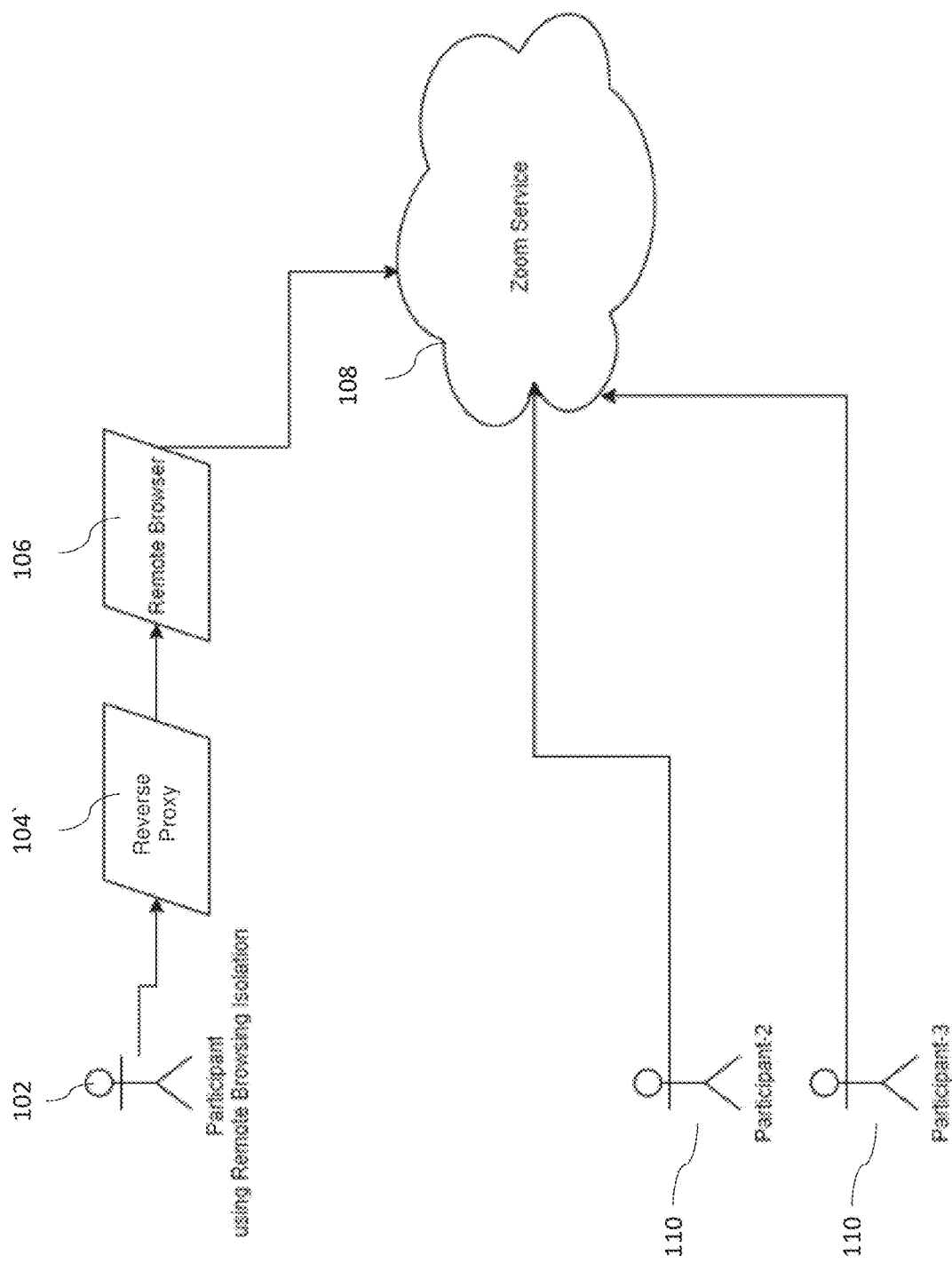
FIG. 1B is a diagram illustrating an example system environment and architecture of another embodiment according to one aspect of the present invention.

In another embodiment, as shown in FIG. 1B, at least one end user 102 operating a user client computing device, i.e., a client computer/machine (e.g., laptop, desktop, mobile device, etc.) interacts with a web service (e.g., web video conferencing service such as Zoom™) 110 via a reverse proxy 104' and a remote browser 106. Further, an additional one or more users/participants (each operating a client computing device) 110 are connected to the WC service.

In the following description, an example embodiment is described within the non-limiting context of a web-based video conference meeting/session. This context is for example purposes only, and intended merely to more clearly demonstrate the structure and function of the components of the present system. All descriptions herein relating to a proxy are to be understood herein as relating to a reverse proxy in a similar manner mutatis mutandis.

Bearing the above in mind, by using the proxy (or reverse proxy) and the remote browser, the End User 102 is able to participate in a video conferencing meeting using a local browser (e.g., Mozilla Firefox, Google Chrome, Safari, Microsoft Internet Explorer, etc.) installed and operating on the client device, and benefit from all the features provided by the video conferencing platform, including audio/video conferencing, desktop sharing, chatting with other participants, transferring files, etc.

The isolation technique provided by the proxy 104 and remote browser 106 allows sharing local resources, such as, for example, audio resources (e.g., microphone), display resources, video resources (e.g., webcam), and the like, from the end user 102 to a Remote Browser 106.

Figure 2:
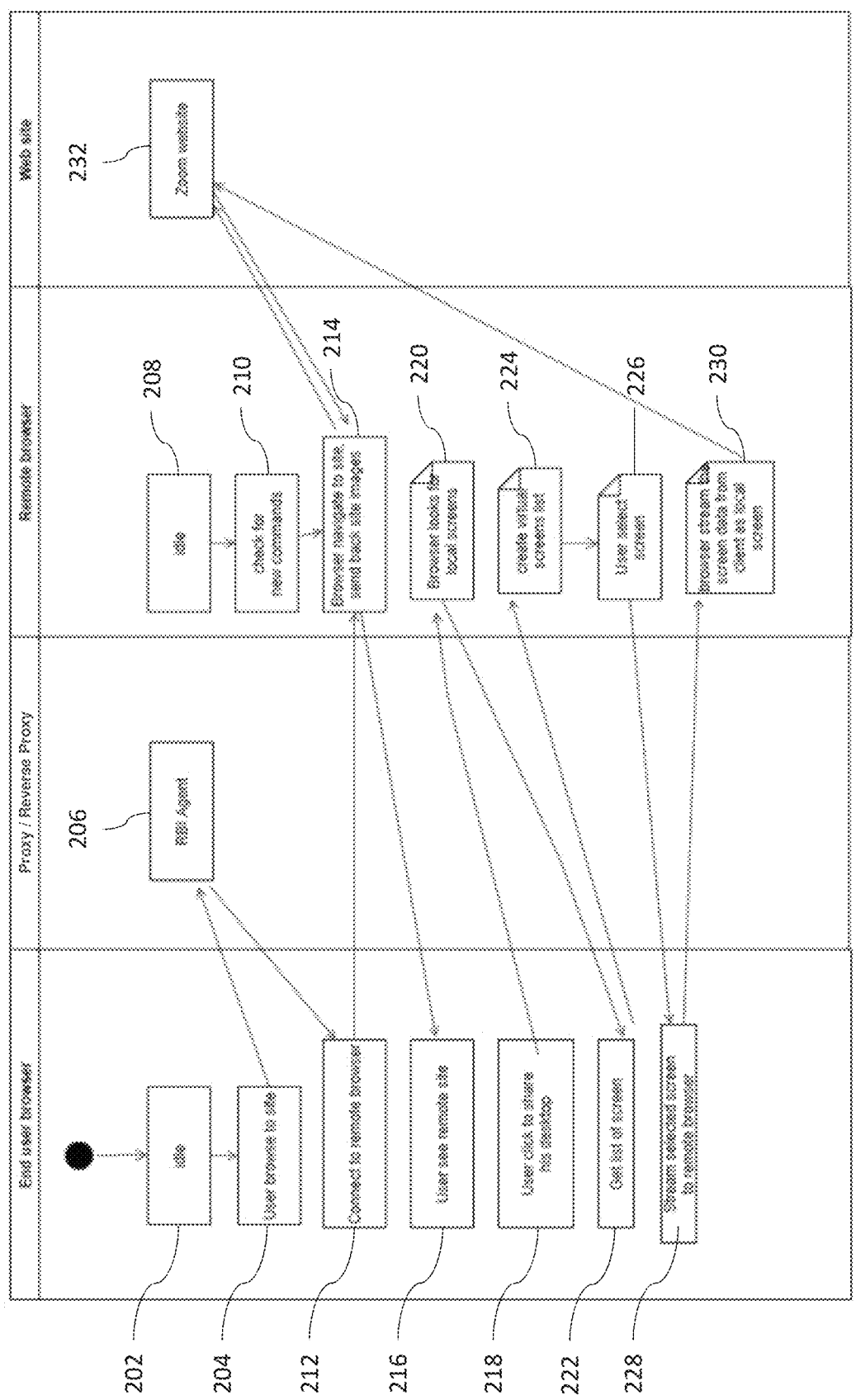
FIG. 2 is a flow diagram of a Web Conferencing session using Remote Browsing Isolation.

FIG. 2 depicts a flow diagram of a Web Conferencing session using Remote Browsing Isolation.

At step 202 the end user browser is idle. At step 204 the client computer Local Browser is connected, via a communication network (e.g., the Internet, an Intranet, cellular network, and the like) to a network element, which in preferred but non-limiting embodiments is implemented as a Proxy. In other embodiments, the network element is implemented as a reverse proxy. At step 206, the local browser receives, via the proxy (or verse proxy), a custom page with an agent (RBI Agent) which, at step 212, connects to the Remote Browser. Prior to the local browser connecting to the Remote Browser, at step 208, the remote browser is idle. This remote browser is preferably a temporary instance on a very secure device or in a cloud or in a cloudless computing environment. According to some embodiments, a new instance of the remote browser is used for every new website. For improved security, the remote browser instance should have a short life, terminating shortly after the local browser disconnects from the remote browser. According to some embodiments, a new instance of the remote browser is used for every new website. At step 210, the Remote Browser checks for new commands. This happens periodically until commands are received or the instance is terminated for other reasons. The RBI agent is executed on the local browser, which connects the local browser to the remote browser (at step 212). The Remote Browser navigates, at step 214, to originally requested site (e.g., Zoom™ site) 216 and sends back screen images to the RBI agent that is running on the local browser.

The Remote Browser sends visual images to the end user, such that every user action performed on the client computer, such as web page scroll, is sent to the remote browser and updated images are sent to the client computer, at step 216. In some embodiments (see FIG. 3, 306), the data is streamed from the Remote Browser back to the Local Browser using WebRTC (as opposed to sending images [e.g., jpegs] to the Local Browser). Either way, this method provides zero risk to the end user, as the end user machine does not receive any external resources.

Ordinarily, when the End-User attempts to open a Web Conferencing (WC) Session in the local browser using a known WC platform (e.g., Zoom™, MS Teams™, Google Meet™, etc.) and join/create a Web Meeting, the browser will request access to local resources on the end-user machine. When using the instant innovative system and method, the Remote Browser intercepts the request to obtain/get/access the local resources (Microphone, Camera, etc.). The request is sent to the Local Browser which performs it and sends the response to the remote browser. The Remote Browser emulates these device capabilities as virtual resources running on the Remote Browser.

An example is depicted in FIG. 2 that will illuminate the explanation above. In the example, at step 218, the user clicks on the web conferencing tool that allows the end user to share his screen (e.g., the 'share screen' tool in Zoom™. What the user is actually doing is moving the cursor or touching the button on the screen which is merely an image of the session that is being held on the Remote Browser. Like a shadow puppet, the share desktop/screen tool is actuated on the WC session running on the Remote Browser. The WC session looks for local screens at step 220. Seeing as the Remote Browser does not have any of the local screens, at step 222 the Remote Browser sends a request to the client computer to get the list of local screens (or any other resource) from the end user browser/device. At step 224 the Remote Browser generates a virtual list (e.g., based on meta data received from the local browser regarding the available screens) of screens which would look the same as if the WC session were running on the local browser or device. In some embodiments, the system even emulates the local screens on the remote browser to allow the user to select which screen they wish to render or interact with.

At step 226, the user selects a screen on the Remote Browser. At step 228 the Remote Browser retrieves or receives a stream of the local screen from the local browser. For example, the remote client captures that screen (e.g., captures an image of the screen) and sends the capture in a stream to the remote instance via the browser. At step 230 the Remote Browser streams the screen data from end user device as if it was a local screen. For example, the remote browsing session creates a virtual screen that provides the data received from the client as a local screen. The WC session is unaware of the fact that the screen data is being streamed from the Remote Browser. At step 232, the WC session on the remote browser sends the screen to the Zoom™ website for sharing with the other participants.

The Local Browser can share its local resources (microphone, etc.) using, for example, WebRTC, to the Remote Browser, which redirects the relevant streams to the Web Conferencing Web Site/Local Browser.

WebRTC (Web Real-Time Communication) is a Web specification that can be used to add real time media communications directly between browser and devices via application programming interfaces (APIs). WebRTC enables voice and video communication to work inside web pages. This can be done without any prerequisite plugins being installed in the browser. The instant system and method must also 'mislead' the WC service into believing that the information that the WC service is receiving on the Remote Browser is actually coming from the Local Browser. The Remote Browser emulates the screens and resources of the Local Browser/end user device such that when the service displays (sends to the WC website for distribution to the other members on the conference session) an image of one of the screens from the local/end user device, it 'believes' that it is displaying an image of the device on which it is running, which is not true.

The terms used in the foregoing paragraph anthropomorphize the WC service are used to convey a meaning as opposed to describing the technical manner in which the functions are performed. Suffice it to say that the Remote Browser running on a secure, remote device (proxy) provides the WC service with all the data and/or meta data that the local browser and/or local device would, thereby tricking the WC service to believe that it is running on a local browser of the local/end user device. For example, the instant system may create virtual or simulated resources and screens in such a way that the WC service interprets these screens and resources as being real.

It is important to note that by using the proxy/remote browser secure method, the End User can join any web conference with other participants connected to the web conference regardless of whether or not the other participants use this secure method.

This method provides a complete and transparent solution for Web Conferencing using Remote Browsing Isolation.

By using WebRTC, the solution enables the utilization of local resources which are generally hard to share with the Remote Browser and provides a good and low-latency user experience.

Essentially, this renders the remote content on the local browser and eliminates the need for locally operating software or applications on the end user client computer as they are functioning in the remote instance. No software or applications are executing on the local machine and the risk of unsecured or unapproved 3rd party software operating locally is eliminated.

For example, when an end user shares a screen, webRTC transfers (streams) the image of the shared screen to the Remote Browser. The WC service running on the Remote Browser (e.g., Zoom™, Google Meet™ etc.) sees the image of the shared screen as if it was a local screen. Some WC services use webRTC to relay this image to other participants, other do not. For example, Zoom™ does not use webRTC to relay this image to other participants whereas Google Meet™ does use webRTC to relay the data.

The foregoing has outlined some of the more pertinent features of the invention.

These features should be construed to be merely illustrative. Many other beneficial results can be attained by applying the disclosed invention in a different manner or by modifying the invention as described above.

Figure 3:
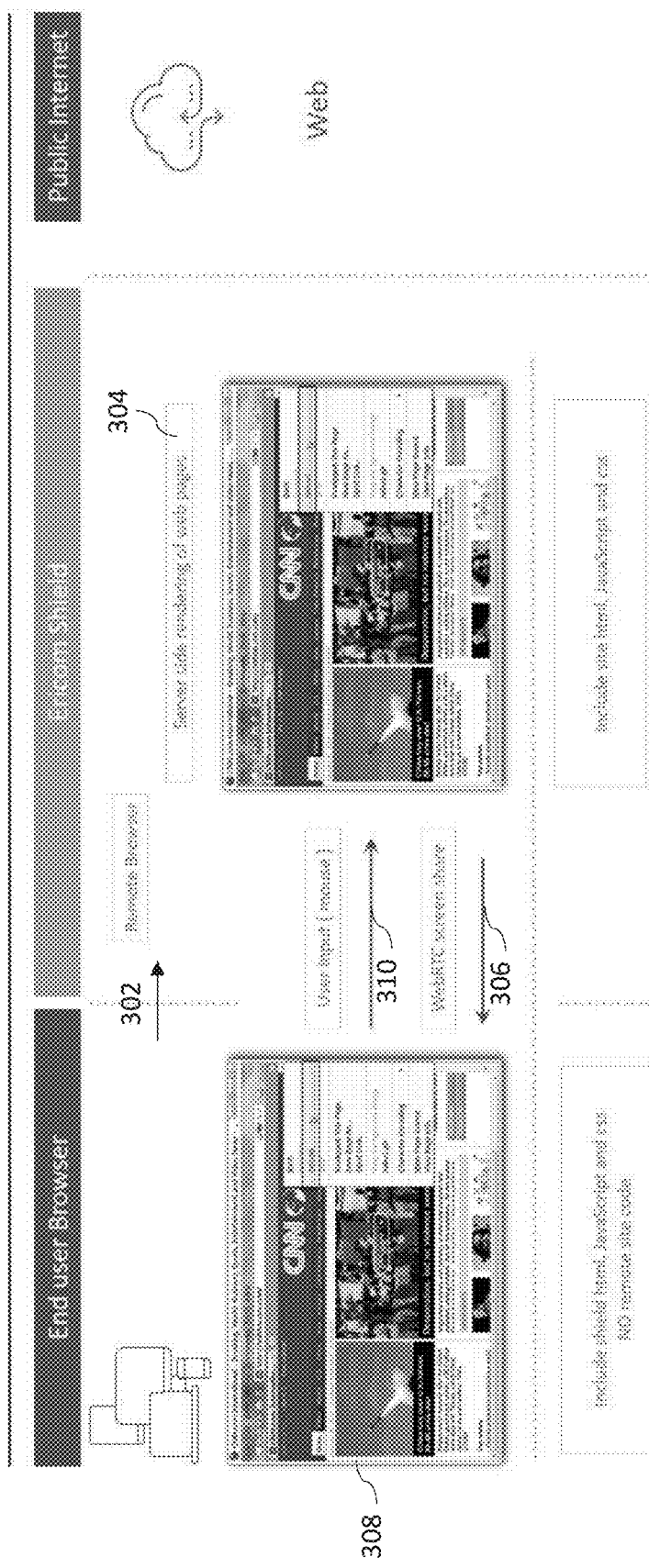
FIG. 3 is a flow diagram of an example implementation of the method of the instant system.

The subject matter described herein can be conceptually subdivided into various aspects of the present invention which are believed to each stand alone and have utility in their own right. Some of the various aspects may, in certain instances, be used to advantage in combination. The following is a brief summary of some examples of the various aspects of the present invention:

1. Video-Streaming Rendering Mode (FIG. 3)
   a. "Remote Browser rendering" sends visual images to the end user, every user action (e.g., scroll), is sent to the remote browser and updated images are sent to the client, thereby providing zero risk as the end user machine does not receive any external resources.
   b. In stream mode, in-house algorithms are executed to determine (in real-time) what image quality to use, what update rate (Frames Per Second—FPS) to allow and execute flow control logic to allow better user experience.
   c. In Video Streaming Rendering Mode (e.g., webRTC rendering), webRTC algorithms are used to determine whether to use TCP or UDP networking, select the proper codec for video (VP8, VP9, H264), audio (opus), change quality and bitrate and provide streaming video instead of sending images.
   d. Flow—FIG. 3 depicts a flow diagram of an example implementation of the method of the instant system. While the steps detailed hereafter are described sequentially, some of the steps may be performed out of order or simultaneously to other steps. Furthermore, various steps may be omitted for the purpose of conciseness and flow of explanation. Those skilled in the art would be aware of the necessary steps, even if not explicitly mentioned herein. Accordingly, the foregoing is not intending to limit the process to these steps and only these steps or to the sequence in which they are presented. Further, in some implementations, one or more of the foregoing steps may be omitted where relevant. The aforementioned applies equally to other processes detailed herein.
      i. At step 302, the End User browser opens a connection to the Remote Browser, also referred to herein as "Ericom Shield".
      ii. At step 304, the Remote Browser renders the web pages and at step 306 the Remote Browser shares its virtual screen with the end user browser seamlessly. In some embodiments, the Remote Browser sends image files (e.g., .jpeg files). In other embodiments, as depicted in the Figure, the Remote Browser uses WebRTC (or similar program) to stream the screen back to the Local Browser.
  iv. At step 308 the End User browser displays the remote screen.
  v. When a user clicks or performs any action, that action, at step 310, is mirrored and performed on the Remote Browser.
  vi. No JavaScript code is sent to the end user browser.
2. End User Support Via RBI When a user browses via the RBI, the user has the ability to request Remote Support from the Enterprise Helpdesk. In the Remote Browser, a new option in the context menu is "Request Remote Support". When the End User chooses this option, a Video Conference Session is initiated, and a Support representative is invited to the session. The End User will be able to share his desktop and the support representative will be able to provide the support required.

3. Improve Resource Usage Based on User Face Behavior Detection

To improve resource usage efficiency, the RBI system can capture the user webcam video stream (for example by leveraging webRTC technology), and apply machine learning algorithms (e.g., TensorFlow) to the video stream. This will allow to detect the user's face and his facial expressions and associated body language (such as in https://webrt-chacks.com/stop-touching-your-face-with-browser-tensor-flow-js/).

In this aspect, the system can adjust the quality of the user's web service based on the facial/body language detection. For example, the system may improve the quality of the page the user is viewing if the user is looking at the page and reduce the quality of the page if the user looks away.

4. Face Recognition to Websites as an Authentication Method
  a. Per configuration, the admin can define for each site/user/group a requirement to pass a facial recognition test before the user can connect to specific sites.
  b. End Users can setup their Face-ID using an internal Website.
  c. When an End User attempts to connect to a site that requires face recognition, the User's webcam is used to capture images of the user's face in order to recognize the User lace-ID, for example using webRTC. The captured images (at least one of which includes facial image) are sent to a machine learning/AI engine that detects the face of the user from the images and compares the detected face to the User Face as pre-configured.

Figure 4:
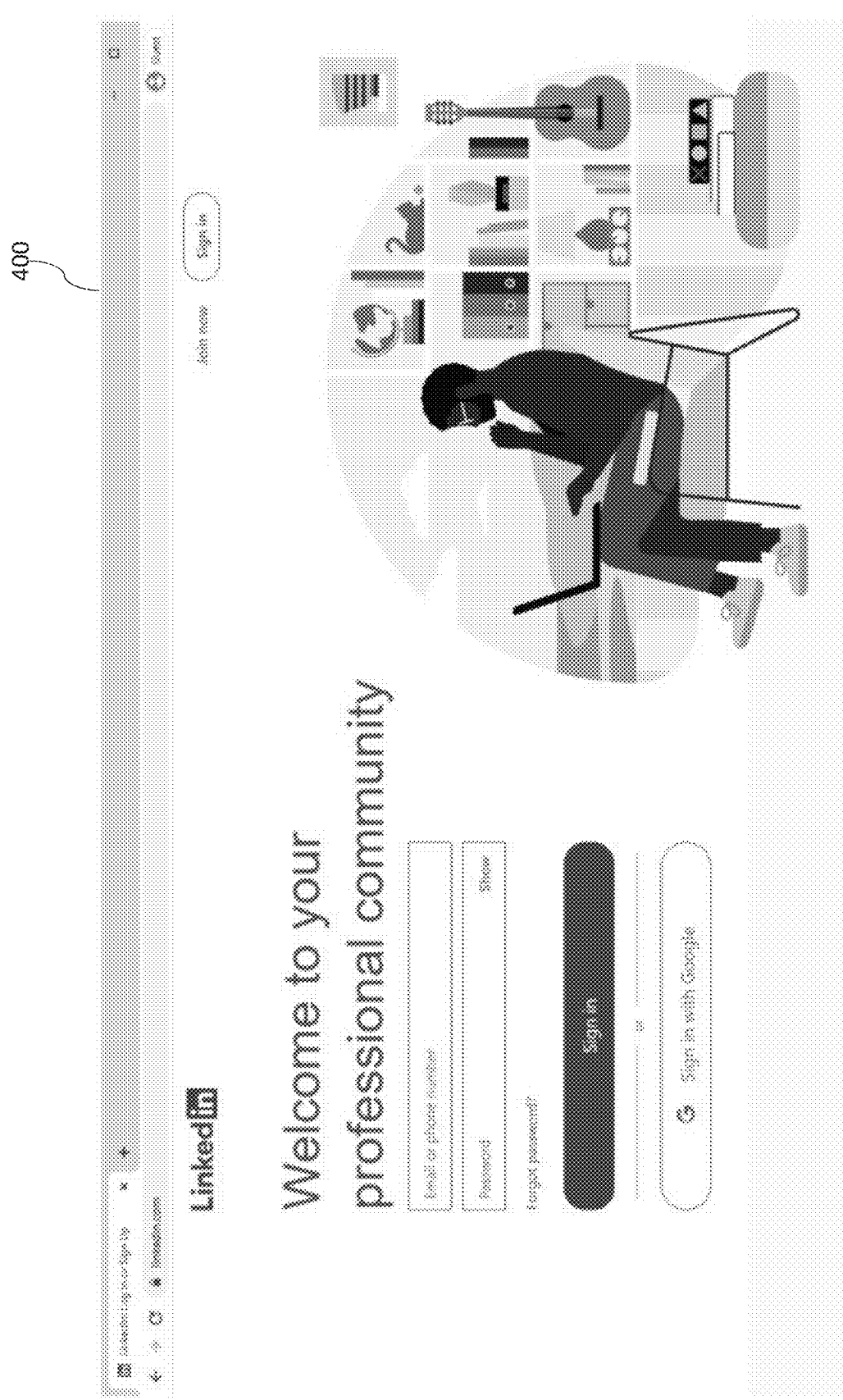
FIG. 4 is a login-in page 400 of a web site that requires user log-in credentials.

Another feature of the instant system is Smart Read-Only mode. FIG. 4 is an illustration of the login-in page 400 of a web site that requires user log-in credentials. In a Read-only mode, the user can access the webpage but is not able to type anything into that page (for example the user is prevented from entering information into input fields of the page). This feature is very helpful in cases of sites that are suspected to be phishing sites since if a user cannot enter information into the page, a malicious actor cannot steal data associated with the user.

However, current read-only solutions are provided on a site level, such that the user cannot type on any of the web pages of a web site. While this may be acceptable for certain web sites, it is not usable in other web sites, for example, LinkedIn™ Facebook™, and other sites requiring user log-in credentials, where if the user is in read-only mode, the user is unable to enter credentials to log in to the site.

Figure 5:
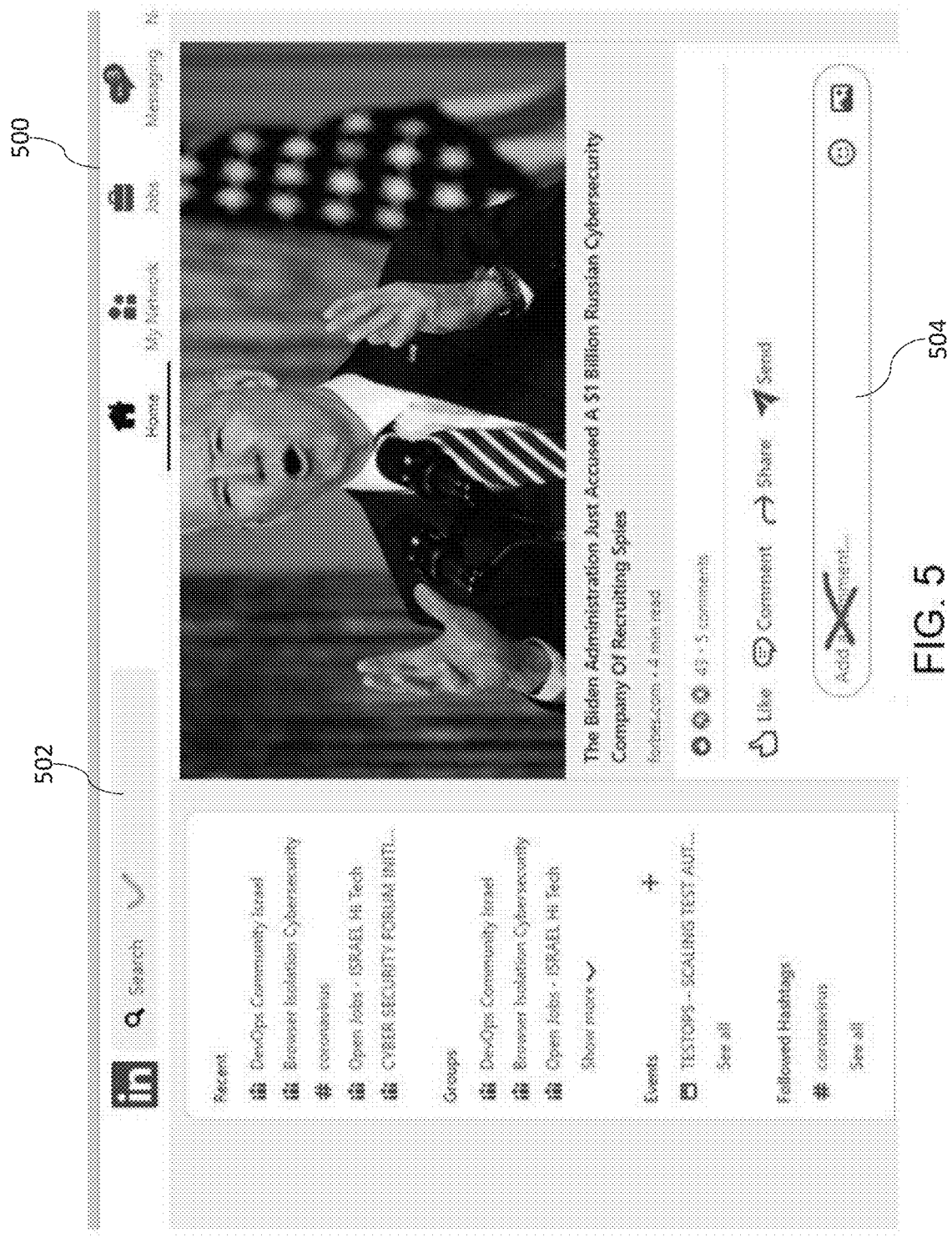
FIG. 5 is an example webpage 500 that is rendered using Smart Read-Only mode of the instant system and method.

FIG. 5 is an example webpage 500 that is rendered using Smart Read-Only mode of the instant system and method, with the RBI agent, proxy and Remote Browser. The present feature of the system allows definition on a page-level (as opposed to site level). The system renders the page 500 as read-only, except for special elements on the page, such as credentials and search fields 502. The Search field 502 is marked with a check mark to illustrate that the field is a writeable (read/write) field. In addition, a list of elements can be also allowed based on CSS (Cascading Style Sheets) selectors, for example "input[type=" search "]" will be allowed to be in write mode. In embodiments, the allowed elements are admin-defined (i.e., can be configured by a system admin) In other embodiments, the allowed elements are automatically detected by internal system logic, for example by scanning the elements of a page to determine the types of elements present in the page. A machine learning model can be used to determine "safe" fields and/or "unsafe" fields.

On the other hand, the read-only fields can be defined in one of at least two manners: (1) all the non-allowed fields are automatically read-only (i.e., the default setting is read-only and specific fields are changed from read-only to read/write); (2) a predefined list of fields are [automatically] rendered read-only (i.e., in a similar way to which the system decides and implements read/write fields described above, the system, in this embodiment, implements read-only fields). According to the latter option, the page default is for all the relevant fields to be read/write fields.

According to another embodiment, the system can include a user interface for the enterprise administrator to designate the writeable fields and/or the read-only fields. For example, a bank would like to allow employees on the internal network to access LinkedIn™. The instant system, according to an embodiment, includes a user interface that allows the bank's network administrator to select which fields on the website the employees can write in, for example the credential field and the search field, and the rest of the fields for this website will be read-only. The user interface can provide even higher resolution functionality to the network administrator (or similar person). For example, a company's sales department may be allowed to write (post) content on social media sites, while the other departments in the company may only be able to write in the Login and Search fields of the same social media sites.

One example of a field that is designated (e.g., by the administrator, or by a machine learning bot, by rules in the rendering code, etc.) as a read-only field, is the comments field 504 in FIG. 5, which is indicated with a 'X' to illustrate that the field is read only.

Currently, many browsers have Autofill functions that automatically fill in the user's username and password for the site. In order to facilitate this functionality, most websites use standard field identifiers for login fields. As such, these fields can be programmed as writeable fields using by allowing these standard fields.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:
1. A method for secure browsing, comprising:
  providing a system for protecting a user browsing an internet website;
  rendering a requested web page of said website into read-only mode; and changing selected input fields on said requested web page into write mode, wherein said selected input fields are automatically selected using a machine learning model, and wherein the machine learning model is configured to determine which input fields on the requested web pages are safe.

2. The method of claim 1, wherein in said read-only mode, all input fields are initially rendered into read-only fields.

3. The method of claim 1, wherein the machine learning model is configured to further determine which input fields on the requested web pages are unsafe.

4. A method for secure browsing, comprising:
providing a system for protecting a user browsing an internet website;
rendering a requested web page of said website into read-only mode; and
changing selected input fields on said requested web page into write mode, wherein said selected input fields are automatically selected using a machine learning model, and wherein the machine learning model is configured to determine which input fields on the requested web pages are unsafe.

\* \* \* \* \*